US009619373B2

(12) United States Patent
Alexander et al.

(10) Patent No.: US 9,619,373 B2
(45) Date of Patent: *Apr. 11, 2017

(54) METHOD AND APPARATUS TO SEMANTICALLY CONNECT INDEPENDENT BUILD AND TEST PROCESSES

(75) Inventors: Stefan Alexander, Boeblingen (DE);
René Pietzsch, Boeblingen (DE);
Sebastian Schaefer, Boeblingen (DE);
Andreas Trinks, Boeblingen (DE);
Henning Wilbert, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 545 days.

This patent is subject to a terminal disclaimer.

(21) Appl. No.: 12/967,623

(22) Filed: Dec. 14, 2010

(65) Prior Publication Data

US 2011/0145793 A1 Jun. 16, 2011

(30) Foreign Application Priority Data

Dec. 14, 2009 (EP) ..................................... 09179021

(51) Int. Cl.
*G06F 9/44* (2006.01)
*G06F 11/36* (2006.01)

(52) U.S. Cl.
CPC ........ *G06F 11/3676* (2013.01); *G06F 11/368* (2013.01)

(58) Field of Classification Search
None
See application file for complete search history.

(56) References Cited

U.S. PATENT DOCUMENTS

| | | | | |
|---|---|---|---|---|
| 4,558,413 A | * | 12/1985 | Schmidt et al. | 717/170 |
| 5,481,722 A | * | 1/1996 | Skinner | 717/122 |
| 5,495,571 A | * | 2/1996 | Corrie et al. | 714/38.1 |
| 5,673,387 A | * | 9/1997 | Chen et al. | 714/38.1 |
| 5,694,540 A | * | 12/1997 | Humelsine et al. | 714/38.1 |
| 5,758,062 A | * | 5/1998 | McMahon et al. | 714/38.11 |
| 6,810,372 B1 | * | 10/2004 | Unnikrishnan et al. | 703/13 |
| 6,959,431 B1 | * | 10/2005 | Shiels et al. | 717/124 |
| 7,152,227 B1 | * | 12/2006 | Bloom | 717/143 |
| 7,210,066 B2 | | 4/2007 | Madava et al. | |
| 7,480,900 B1 | * | 1/2009 | Zhou | G06F 11/3676 714/38.1 |

(Continued)

OTHER PUBLICATIONS

Steve Best, "Analyzing Code Coverage with gcov", 2003, Linux Magazine.*

(Continued)

*Primary Examiner* — Jue Louie
(74) *Attorney, Agent, or Firm* — Griffiths & Seaton PLLC

(57) ABSTRACT

In order to provide an improved, less error prone method for testing codes of a software application the following steps are proposed: defining for each test case comprised of a predefined test suite a specific footprint according to its test property, wherein said test case footprint comprises references defining which code sections are tested by said test case, marking code sections of the software application to be tested, identifying a test case of the test suite using its footprint matching at least a part of the marked code of the software application, and applying the identified test case on the software application.

8 Claims, 5 Drawing Sheets

(56) References Cited

U.S. PATENT DOCUMENTS

| | | | |
|---|---|---|---|
| 7,614,042 B1* | 11/2009 | Hardy et al. | 717/124 |
| 8,205,191 B1* | 6/2012 | Kolawa et al. | 717/124 |
| 8,276,123 B1* | 9/2012 | Deng et al. | 717/125 |
| 8,341,132 B2* | 12/2012 | DeFrang | 707/695 |
| 8,806,450 B1* | 8/2014 | Maharana et al. | 717/133 |
| 2003/0212924 A1* | 11/2003 | Avvari et al. | 714/38 |
| 2005/0223361 A1* | 10/2005 | Belbute | 717/124 |
| 2005/0273666 A1* | 12/2005 | Ioku et al. | 714/38 |
| 2006/0218535 A1* | 9/2006 | Delmonte et al. | 717/127 |
| 2006/0277439 A1* | 12/2006 | Davia et al. | 714/38 |
| 2007/0240116 A1* | 10/2007 | Bangel et al. | 717/124 |
| 2007/0266351 A1* | 11/2007 | Hampton | 716/4 |
| 2008/0126867 A1* | 5/2008 | Pandarinathan et al. | 714/37 |
| 2008/0172580 A1* | 7/2008 | Davia | G06F 11/3676 714/38.14 |
| 2008/0209276 A1* | 8/2008 | Stubbs et al. | 714/38 |
| 2009/0006066 A1* | 1/2009 | Behm et al. | 703/15 |
| 2009/0265681 A1* | 10/2009 | Beto | G06F 11/3688 717/100 |
| 2010/0042959 A1* | 2/2010 | Bhinge | G06F 11/263 716/136 |
| 2010/0131497 A1* | 5/2010 | Peterson | G06Q 10/06 707/722 |
| 2010/0146340 A1* | 6/2010 | Bhate et al. | 714/38 |
| 2011/0047531 A1* | 2/2011 | Wang | 717/130 |
| 2011/0125798 A1* | 5/2011 | Misch et al. | 707/785 |

OTHER PUBLICATIONS

Jones et al. "Empirical Evaluation of the Tarantula Automatic Fault-Localization Technique", Proceedings of the 20th IEEE/ACM international Conference on Automated software engineering, 2005, pp. 273-282.*

Adrian Kuhn et al., "Semantic Clustering: Identifying Topics in Source Code," http://scg.unibe.ch/archive/drafts/Kuhn06b SemanticClustering.pdf, Jun. 29, 2006, 30 pages.

* cited by examiner

METHOD AND APPARATUS TO SEMANTICALLY CONNECT INDEPENDENT BUILD AND TEST PROCESSES

PRIORITY CLAIM

This application claims priority to European Patent Application No. EP09179021.2, filed Dec. 14, 2009, which is hereby incorporated by reference in its entirety.

BACKGROUND OF THE INVENTION

Field of the Invention

The present invention relates generally to software processing, and more particularly, to systems for improving computer software testing using test coverage data.

Description of the Related Art

Within the field of the invention, translating source code (human readable representation of a program, a computer language) into the target code in binary form (machine readable representation) is well-known. This process is typically called a compile or build process. FIG. 1 illustrates this with a build process 120 connecting between a respective source code 110 and the resulting executable program 130.

A software program should be sufficiently tested to determine if it operates error-free, before it is used for "production" purposes. Therefore, automated execution of test suites is also well-known prior art. A test suite is a pre-compiled list of test cases. These test case lists are created manually or semi-manually today. FIG. 2 illustrates an example of a test process. In a first step 210 the freshly built program (i.e. the output of the build process of FIG. 1) is deployed, which is partly automated in prior art. Then, in a further step 220 a test case list is created manually. Next, the program is executed multiple times using the parameters of each test case comprised of a test case list 235 in a sequence of test runs, see step 230. Further, the results of the test runs are evaluated in a step 240.

In more detail, so-called "code coverage" itself is also a well-known prior art technique in software testing.

Semantic clustering is also a known technique, see for example: (http://www.google.de/url?sa=t&source=web&ct=res&cd=3&ved=0CBcQFjAC&url=http%3A%2F%2Fscg.unibe.ch%2Farchive%2Fdrafts%2FKuhn06bSemanticClustering.pdf&ei=-xzFStilOsjFsga33eTZDg&rct=j&q=semantic+clustering&usg=AFQjCNEONw34mOwdmrm6k2ufA2Nc0PNPLQ)

After the preceding introduction into prior art, the disadvantage of prior art will be described in relation to the present invention as follows next below:

As the use of computer software in performing daily tasks rapidly increases, assessing software reliability through software testing has become an imperative stage in the software development cycle. As is well known, software testing is directed toward eliminating defects (i.e., bugs) in computer software, which if undetected, can create significant negative results.

Typically, software testing process involves testing of each specification document by one or multiple test suites. For simplifying the testing operation and ease of reference, test suites are divided into sections, such as tests, with each test being composed of several test cases. For the same reasons, the specification documents are also divided into, among others, chapters, sections, subsections, and assertions. As used herein, assertions are defined as Boolean expressions designed to convey a necessary behavior of the software program and are typically included in the text. Assertions may be identified by implementation specific terminology such as "must," "should," "always," "optional," etc.

As the primary goal in testing software application testing is to ensure that the specifications are thoroughly tested, it is crucial to create test suites that when run accumulatively, test the entire specification. Thus far, however, the current state of software testing is incapable of providing a test developer information confirming that a given assertion in the specification document has been tested.

In accordance with the current testing process, the specification document is reviewed by the test group architecture in an attempt to locate all the assertions. Unfortunately, the reviewing process must be performed manually, making this task very tedious and time-consuming. To make the matter worse, merely locating each of the assertions in the specification does not provide the test developer with sufficient information to determine whether a particular assertion has been tested.

Consequently, each assertion must be mapped to the test case designed to test that particular assertion, in an attempt to configure that each and every assertion is tested. Unfortunately, this mapping operation is also very lengthy and tedious as it is performed manually by the test group architecture. Furthermore, despite being time consuming and a waste in resources, the mapping operation provides the test developer very limited information about the test coverage of a specification.

U.S. Pat. No. 7,210,066 B2 addresses these problems and discloses a computer method for software testing using test coverage data focussing to ensure that a specification of an software application (a static document, created upfront the implementation process) is optimally tested by a test suite (a collection of test cases). This prior art method therefore matches static information derived of the specification (the assertions in the assertion document) with a static file defining a relation what assertions are tested by which test case.

However, in that published document the code coverage information is generated manually by creating so-called assertions from a (hand written) specification document. So when the specification is changed, the assertions have to be changed as well. Assertions are assigned to test cases, so that one has the relation between certain parts in the specification and test cases that test this specific part.

Disadvantageously, these processes of building a program and testing the program are not connected today and do not share information. So, the before-mentioned work is quite tedious and error-prone.

SUMMARY OF THE INVENTION

The objective of the present invention is to provide an improved, less error prone method for testing codes of a software application.

According to its broadest aspect, the present invention discloses a method for testing the code of a software application by means of test cases, the method being characterized by the steps of:

defining for each test case comprised of a predefined test suite a specific footprint according to its test property, wherein said test case footprint comprises references defining which code sections are tested by said test case, marking code sections of the software application to be tested;

identifying a test case of the test suite using its footprint matching at least a part of the marked code of the software application;

applying the identified test case on the software application.

The present invention discloses a novel and advantageous system infrastructure and method how to interconnect the prior art build and test processes. The inventive method and system allow for an advantageous automatic selection of test cases based on certain, predefined criteria such as the best set of test cases for testing a function which had been changed before in the precedent build process iteration. Also, a novel and advantageous way of how to derive the information needed for the selection process is disclosed by the inventive method.

An advantageous structural feature of the present invention is a so called test case repository. In this entity the test cases will be assigned to the functions they test in the software product under development. (See also FIG. 3).

This assignment can be made statically via tags and assertions (as done in the above cited prior art US patent) or dynamically via semantic clustering or as shown later below. Another advantageous (methodical) feature is that the build (translation) step is extended in such a way that changes between the current program and a predecessor version (typically the most recent predecessor) are tracked. This information is saved into a structural unit referred to in here as change log. (See also FIG. 3).

The information saved in that context can include the changed source code lines, changed function blocks or function or other software structure elements as they are all known in prior art.

Another advantageous methodical feature is the introduction of an automated "create test case (tc) list" step. In this step the before-mentioned change log is read and evaluated. The "create tc list" step evaluates what code sections of the program did change. It then reads the test case repository and matches against this information all test cases which are testing the changed code sections of the source code.

As a last step the found test cases will be evaluated regarding their coverage. An improved set of test cases regarding number of test cases, run-time and resource consumption is then automatically created—referred to as "improved test case list"). An embodiment of this step will be described later in this proposal.

Further, advantageously, the invented method is based on "real" code coverage, in contrast to coverage as defined manually in a specification document as it is known from prior art. For achieving this, preferably the prior art algorithms of prior art code coverage tools like "Rational Purify or Bullseye Coverage" are used.

Usually, these prior art tools are used to spot gaps in prior art test suites. In order to do this in prior art, a complete test suite is executed, coverage data is tracked and then, after all test cases have been performed, code sections with low or no coverage are exposed.

According to the invention, these algorithms are used in a different way:

First, tracking the coverage for a single test case (not the complete test suite). With that information, the code section covered by the test case is determined.

Second, using a certain algorithm (explained in full detail later below), for every test case a so-called "footprint" is created automatically without any human intervention, comprising information about the code sections the test case actually covers.

Using these automatically created footprints which are based on real code coverage information the skilled reader will appreciate that an improved test case bucket for a certain code change can be selected. Knowing which lines of code have been modified, the test cases that cover the changed parts—and ONLY those test cases that cover these parts—can be automatically selected and executed. This ensures that all changed code sections are covered, and that the execution time for the overall test is low, since only the relevant test cases are selected and executed in the test runs.

DETAILED DESCRIPTION OF THE DRAWINGS

Figure 1:
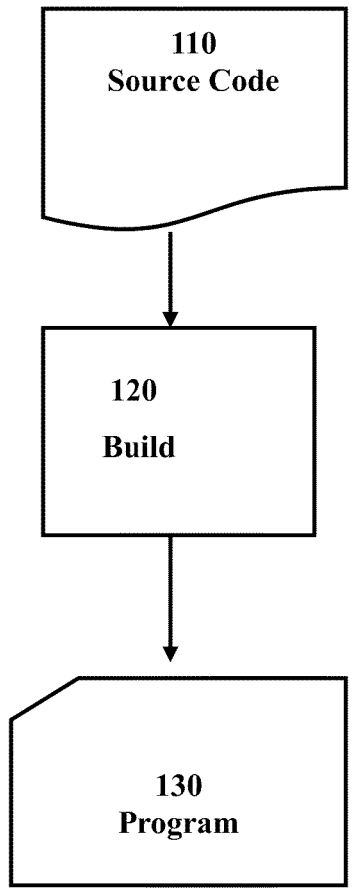
FIG. 1 illustrates the most basic components of a prior art program build process.
Figure 2:
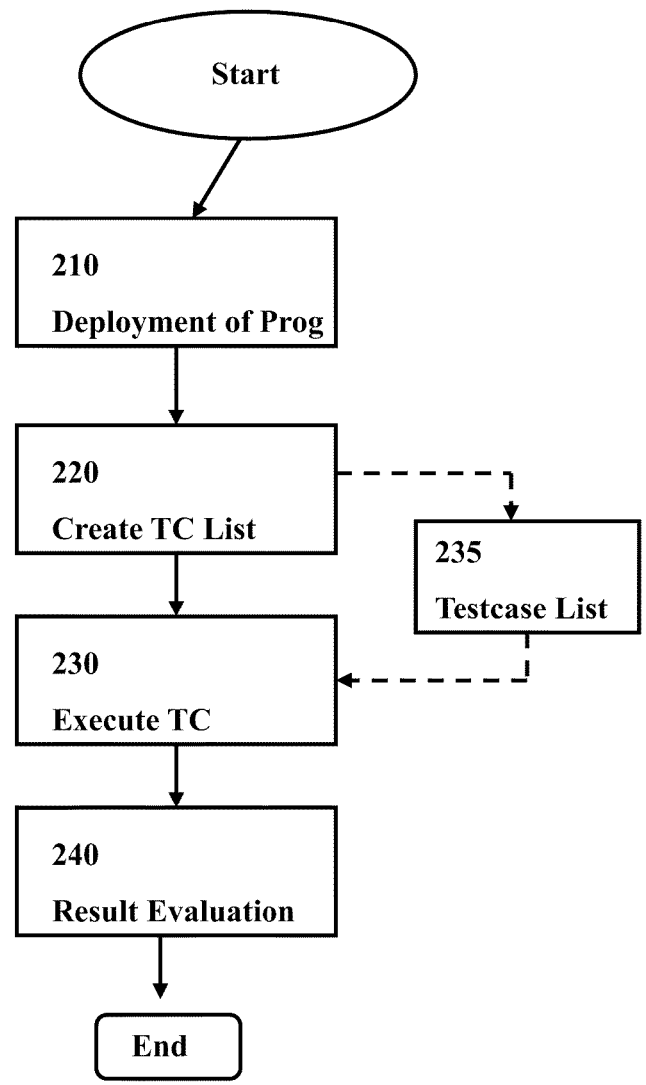
FIG. 2 illustrates the most basic components of a prior art program test process.
Figure 3:
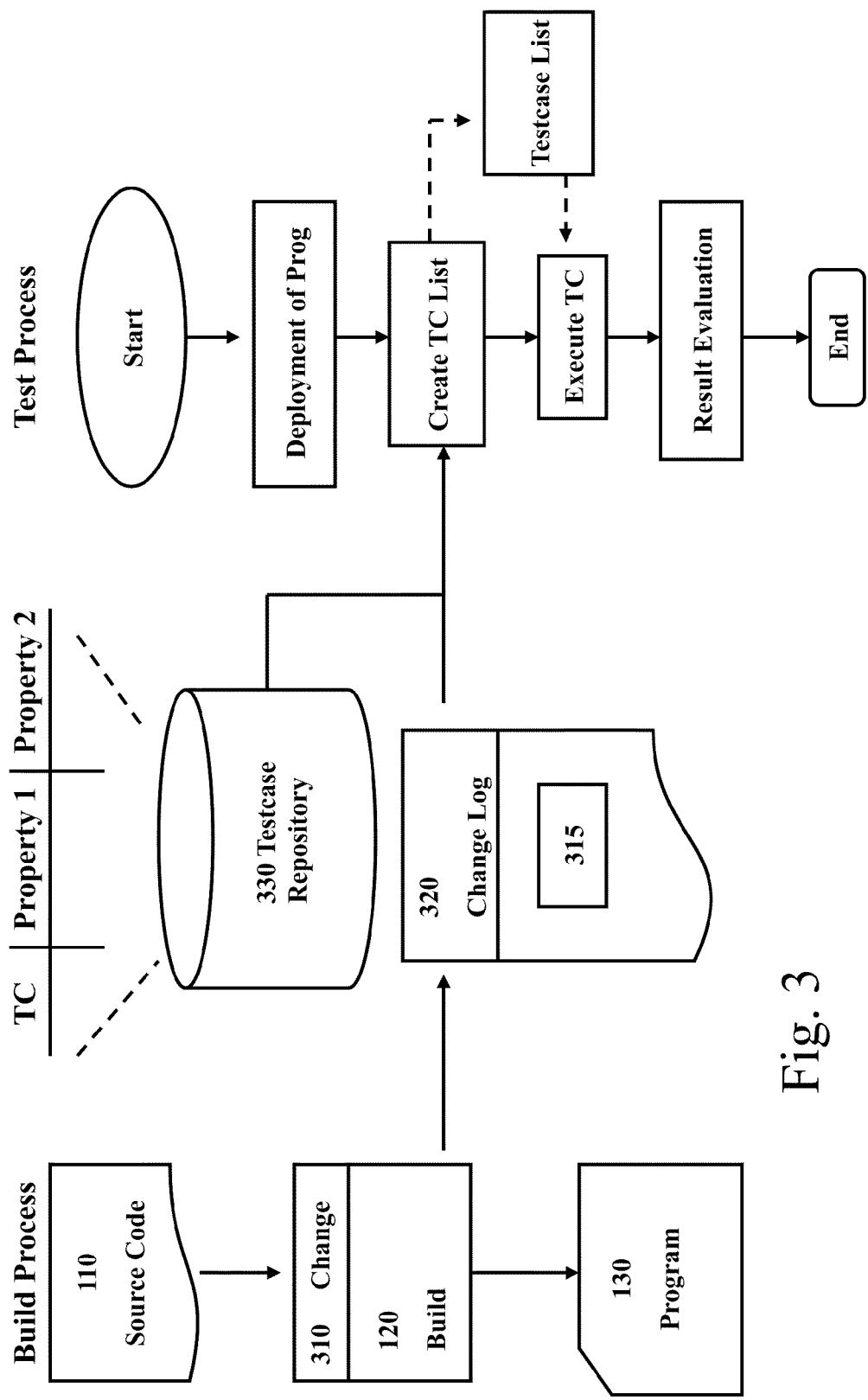
FIG. 3 illustrates the most basic structural and methodical components of a preferred embodiment of the inventive method, integrating the build and the test process.

With general reference to the figures and with special reference now to FIG. 3 illustrating the most basic structural and methodical components of a preferred embodiment of the inventive method, integrating the build and the test process, see the left and the right part of the figure, respectively, the focus is now directed to an arbitrary change of the source code in a step 310 during the build process 120. In this code change step 310, it is assumed for the sake of simplicity and enhanced clearness that only a single line of code is changed, referred to in here as "changed code line" 315.

So, the build step 120 is extended the change of code line 315 is tracked as a change event between the current program version, say version 34 and a predecessor version (typically the most recent predecessor, say version 35).

In more detail, the new code line is automatically extracted as a copy from the source code and is automatically pasted into the change log at the bottom most position, as it is a log document which is continued serially. The entry in the change log has an entry ID, and a code section ID, in order to guarantee the consistency of the code line definitions across multiple program versions.

In this context, code lines may be determined based on different references. One may index the lines in a single file but it may also be considered to take all source code (in all files) of a program as the reference to which line indexes are created. In this case it is assumed that each line of the complete source code is uniquely identifiable either by its line or by any other unique identifier. In this embodiment of the inventive method it is preferred to make use of this unique line identifier—for simplicity it is referred to this as a "line number"—during the creation of the footprints.

If the change from an exemplary version 34 to version 35 removed some code lines of the source code the footprint of each test case is adapted. The adaptation is performed by simply removing the corresponding lines from the footprint definition.

In case the content of a line just was changed it is assumed that footprints are still valid. In other words it is assumed that a test case that previously executed this line will still run through it.

The last case are new lines of code. In case new lines are added it is assumed that test cases that tested the line "above" and the line "below" the insertion are also testing the new lines. So their footprint signature will be extended with the newly added lines marking it as line to test.

In the footprints of all other test cases the lines are also inserted as "empty", meaning no match for testing will result.

Any of the assumptions above may be wrong, but the effect of a wrong assumption is not critical as long as the change keeps below a certain limit, which will differ with the size/amount of source code. Either way, the next run with an instrumented build will synchronize the before-mentioned assumptions with the reality and results in accurate footprints.

Further, in the repository 330 the test cases are assigned to the functions and code sections they test in the software product under development.

This assignment is done by automatically matching the changed code section with those test cases which actually test this changed section.

In order to do that, each test case has been enriched according to this embodiment with some additional information referred to as its "footprint"—preferably in a precedent procedure referred to as "footprint generation" or "footprint definition".

The basic flow of the creation of code coverage data in this context of footprint generation is a sequence of the following steps:

A prior art algorithm of a prior art code coverage tool is performed during an "instrumented Build" process of the software product under development.

Then a test is executed, and the coverage data of this test case is generated and saved in the test case repository.

This is repeated for all test cases present for said software product.

The procedure of footprint definition or footprint optimization is performed advantageously as described next below with reference to FIG. 4.

Figure 4:
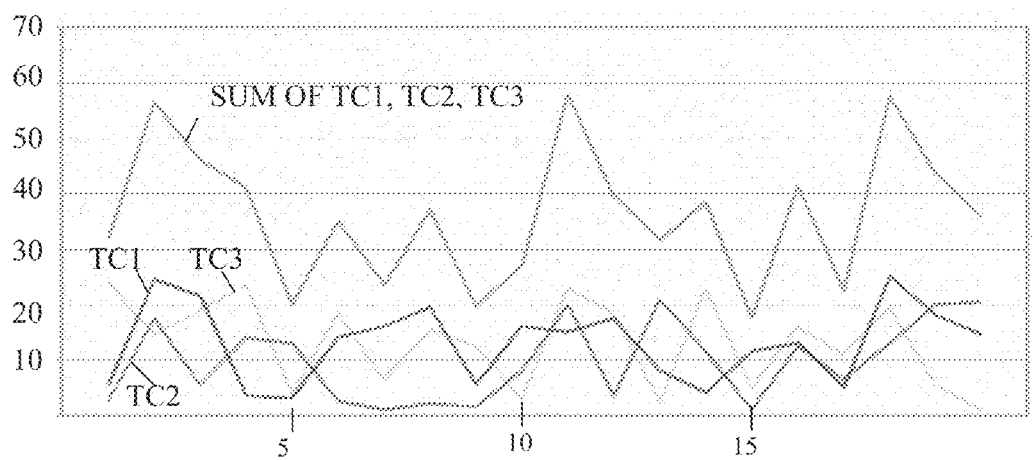
FIG. 4 shows an exemplary result of a footprint calculation according to a preferred embodiment of the inventive method, using a number of three test cases.

FIG. 4 shows an exemplary result of a footprint calculation according to a preferred embodiment of the inventive method, using a number of three test cases.

In this precedent footprint definition procedure, basically all test cases existing for the software product under development are run once.

In such single test case run a test case runs with "instrumented code", meaning that prior art coverage analysis is enabled, the inventive algorithm counts how many times each line of the source code was executed by this test case. The graph of FIG. 4 is an example of a test suite that contains three test cases marked as TC1, TC2, TC3, wherein each line of code is denoted by a distinct (integer) value on the abscissa axis while the ordinate axis reflects the number of times each line of code was executed by a respective test case.

The upper line is the sum of all three test case code line executions and thus characterizes the test suite as a whole.

Figure 5:
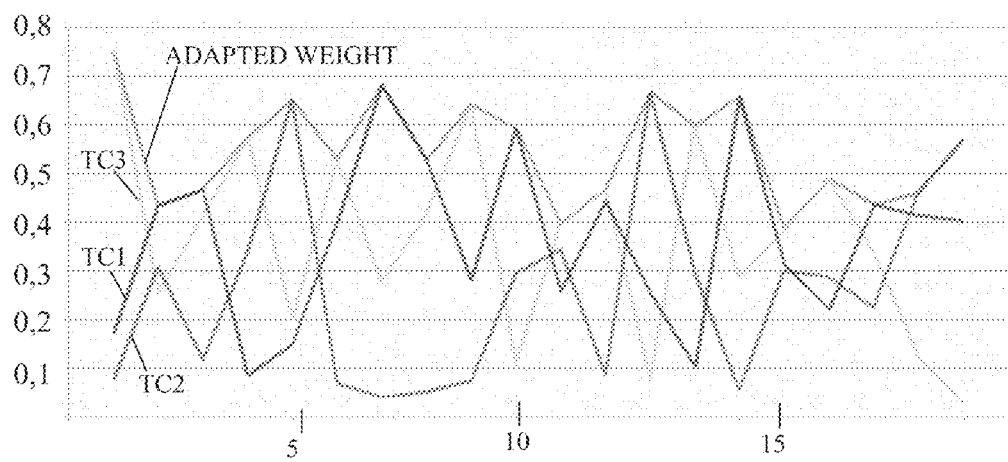
FIG. 5 shows an exemplary result of a footprint calculation according to a preferred embodiment of the inventive method, when generating proportional values and an adapted weight for the three test cases in FIG. 4.

FIG. 5 shows an exemplary result of a footprint calculation according to a preferred embodiment of the inventive method, when generating proportional values for the three test cases in FIG. 4.

In a next step the proportion of each individual test case code line execution is calculated in respect to the respective code line executions of the whole test suite.

This value thus specifies the share of test coverage of each test case for a certain line. A high value indicates that a respective test case is very important for a certain line. It basically means that this test case runs through this line of code for the highest number of times. A low value may indicates that this test is of less importance of a certain line or may mean that the same line is tested by several other test cases equally well (more than one test case executes a certain line for the same number of times so each of these test that portion of code equally well). A value of 1 means that this line of code is only tested once by this test case. A value of 0 indicates that the respective code line has not been executed by the test at all.

From the proportional values for each line of code, as exemplarily depicted in FIG. 5 one may derive the footprint of a test case. Several methods may be used here.

For this example and the depiction of FIG. 5 the most significant test case (or cases if two or more test cases share the same proportional value) is just taken for each line of code. That way the footprint for the test case tc2 is line 5, 13, 19 and 20, for example.

These lines 5, 13, 19 and 20, of code are thus best tested by the tc2 test case.

Another option to drill down to the footprints is to specify a cut-off value. For example only proportional values above 0.6 are be counted, on order to filter out the really "strong" or "specific" test cases.

On the other hand this approach may lead to many blank spots in this example as there are very few lines of which the most significant test case has a proportional value of 0.6 or above. With the first approach a blank spot may identify code sections that are not tested at all. When using the cut-off value based footprinting a blank spot just indicates a portion of code that needs to be tested more specifically.

Figure 6:
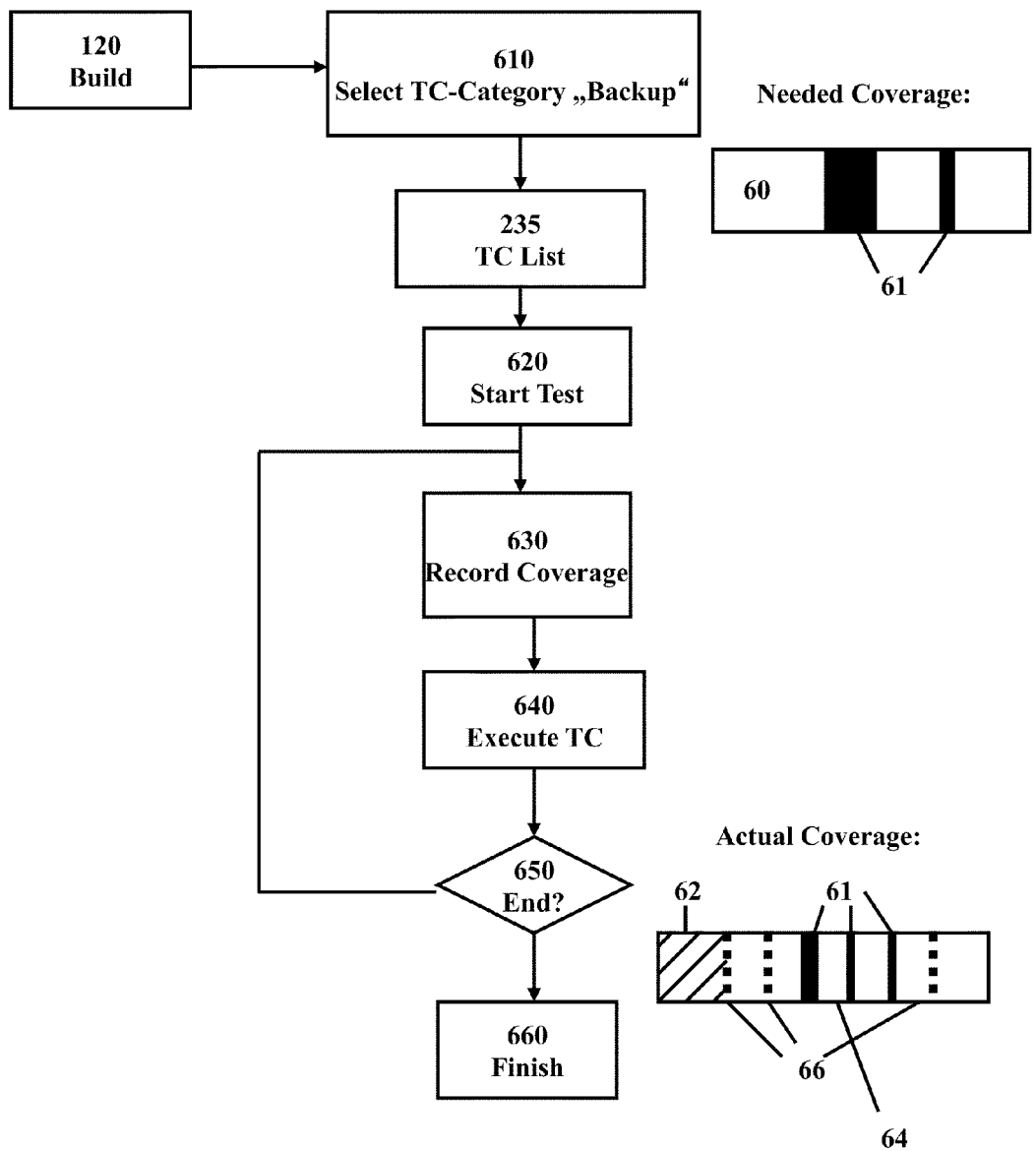
FIG. 6 is a schematic depiction illustrating coverage problems during the prior art test process.
Figure 7:
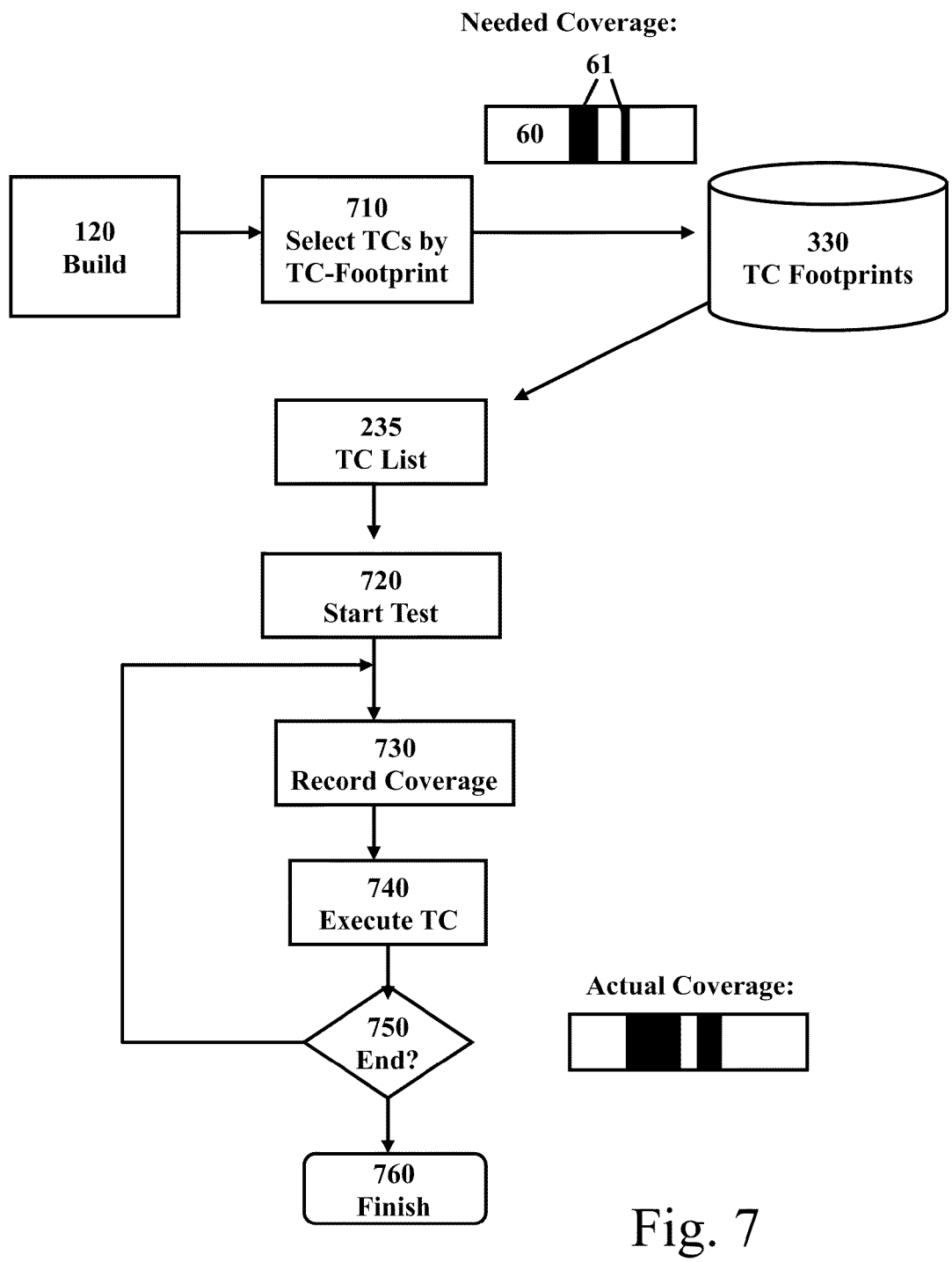
FIG. 7 is a schematic depiction illustrating the elimination of the coverage problems of FIG. 6 during an inventive test process.

Next, by means of FIGS. 6 and 7, the advantages as well as the principal operation of the inventive method are illustrated.

FIG. 6 is a schematic depiction illustrating coverage problems during the prior art test process.

A new build is generated.

Then, a selection of test cases is made. This is usually based on semantically and manually defined categories, for example test cases that test the backup functionality as shown in the figure.

In the figure, the coverage that would be needed to test the new code is depicted at the top right corner of the figure as a "footprint" 60. The footprint 60 illustrates and defines which sections 61 of the code would need to be covered by the tests.

A test case list is created and used as input for the test automation.

The test automation starts to walk through the test case list. Coverage data is recorded while the test cases are being executed. When the last test case has been executed, the test automation stops.

The overall coverage information is collected. When the needed coverage is compared to the actual coverage as depicted in the bottom right corner, there are two things to be noticed:

First, there are unnecessary code sections 66, which means that code was tested that has not been changed. This is not too much disadvantageous per se, but it increases the time needed for the test.

Second, and more importantly, there is a missing code section 64 which means that changed code has NOT been tested, which might pose a serious problem. If the test team does not track coverage data at all, the team will not even notice that the new code was not tested.

FIG. 7 is a schematic depiction illustrating the elimination of the coverage problems of FIG. 6 during an inventive test process.

A new build is generated.

A selection of test cases is made automatically based on the test case footprints stored in the test case repository 330. The footprints are stored in a database, and a query is made based on the changed parts of the code. In response to that query a match between test-required code sections and code sections being available for test by means of a respective test case is performed.

The result of this match and thus that of the query is a list of test cases that serves as input for the test automation.

The rest of the process remains unchanged, except for the result: the automatic, real coverage data based selection ensures that there are no unnecessary tests and that there are no untested parts of the code.

Of course, the same what has been described by means of a code change relating to a single line of source code, also code changes comprising a plurality of code lines may be processed similarly. So, the skilled reader appreciates, that it may be useful to increase the granularity, i.e. to lower the sensitivity of the footprints on a code section level, or on a function level, or a bundle of functions or on any agglomeration of code as well.

Furthermore, the footprints can be used to spot redundant test cases. When the footprints of test cases are equal or very similar, or the footprint of a certain test case is covered by several others already, this test case could be removed from the test suite. Also, obsolete test cases can be exposed. Over time, test suites tend to grow and are reviewed on a high level at most. There might be test cases that cover unreachable or even removed part of the code. These tests would be easy to spot since they would have an "empty" footprint.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

What is claimed is:

1. An electronic data processing system comprising a hardware processor device for testing codes of a software application by using test cases, within a predefined test suite, and a functional component for performing, by the processor device, each of the steps of:
   assigning test cases to functions and code sections that are tested by the test cases in the software application by automatically matching changed code sections with those test cases which actually test the changed code sections;
   storing each of the test cases in a test case repository;
   calculating for each test case comprised from the predefined test suite, a value for each line of the code sections indicating how many times the line was executed by the test case, and a proportional value for each line of the code sections calculated with respect to the code line executions of the predefined test suite;
   specifying a cut-off value associated with the proportional values;
   defining for each test case comprised from the predefined test suite a test case footprint according to the proportional values and the cut-off value, wherein said test case footprint comprises references defining which code sections are tested by said test case, and wherein each line of the code sections with a proportional value above the cut-off value is counted in the test case footprint;
   removing at least one of the test cases, within the test suite, having an equal test case footprint;
   marking the code sections of the software application to be tested;
   tracking the changed code sections between a current program of the software application and a predecessor version of the software application and storing the changed code sections in a change log unit;
   automatically selecting the test cases, within the test suite, based on the test case footprint stored in the test case repository;
   generating a list of test cases, within the test suite, that serves as input for a test automation by matching a test-required code section and the code sections being available for testing;
   reading and evaluating those changed code sections stored in the change log unit and reading the test case repository for matching against those changed code sections all test cases, within the test suite, which are testing the change code sections of source code;

testing only those code sections which have been changed in relation to a precedent test case run;

identifying a test case of the test suite using its footprint matching at least a part of the marked code of the software application to be tested; and applying the identified test case on the software application;

wherein an existing code coverage tool algorithm is used for tracking a coverage of a single test case for determining which code section a predetermined test case covers, and the method further comprises storing said determined covered code section as a test case footprint.

2. The system of claim 1, wherein a change log unit is used for tracking code changes done during an iterative program development procedure, wherein a new code line is automatically extracted as a copy from the source code and automatically pasted into the change log unit, and wherein only test cases are used having footprints stored in said change log unit.

3. The system of claim 1, wherein the test case repository is used for storing assignations of test cases to associated code sections.

4. The system of claim 1, the functional component further capable of performing a step of using said test case footprints for determining redundant test cases.

5. A computer program product usable for testing codes of a software application by using test cases, within a pre-defined test suite, comprising:

a non-transitory computer useable medium including a computer readable program, wherein the computer readable program includes a functional component that when executed on a computer causes the computer to perform the steps of:

assigning test cases to functions and code sections that are tested by the test cases in the software application by automatically matching changed code sections with those test cases which actually test the changed code sections;

storing each of the test cases in a test case repository;

calculating for each test case comprised from the predefined test suite, a value for each line of the code sections indicating how many times the line was executed by the test case, and a proportional value for each line of the code sections calculated with respect to the code line executions of the predefined test suite;

specifying a cut-off value associated with the proportional values;

defining for each test case comprised from the predefined test suite a test case footprint according to the proportional values and the cut-off value, wherein said test case footprint comprises references defining which code sections are tested by said test case, and wherein each line of the code sections with a proportional value above the cut-off value is counted in the test case footprint;

removing at least one of the test cases, within the test suite, having an equal test case footprint;

marking the code sections of the software application to be tested;

tracking the changed code sections between a current program of the software application and a predecessor version of the software application and storing the changed code sections in a change log unit;

automatically selecting the test cases, within the test suite, based on the test case footprint stored in the test case repository;

generating a list of test cases, within the test suite, that serves as input for a test automation by matching a test-required code section and the code sections being available for testing;

reading and evaluating those changed code sections stored in the change log unit and reading the test case repository for matching against those changed code sections all test cases, within the test suite, which are testing the change code sections of source code;

testing only those code sections which have been changed in relation to a precedent test case run;

identifying a test case of the test suite using its footprint matching at least a part of the marked code of the software application to be tested; and applying the identified test case on the software application;

wherein an existing code coverage tool algorithm is used for tracking a coverage of a single test case for determining which code section a predetermined test case covers, and the method further comprises storing said determined covered code section as a test case footprint.

6. The computer program product of claim 5, wherein a change log unit is used for tracking code changes done during an iterative program development procedure, wherein a new code line is automatically extracted as a copy from the source code and automatically pasted into the change log unit, and wherein only test cases are used having footprints stored in said change log unit.

7. The computer program product of claim 5, wherein the test case repository is used for storing assignations of test cases to associated code sections.

8. The computer program product of claim 5, further configured to perform a step of using said test case footprints for determining redundant test cases.

* * * * *